(12) United States Patent
Hanan et al.

(10) Patent No.: US 11,472,938 B2
(45) Date of Patent: *Oct. 18, 2022

(54) GRAPHENE REINFORCED POLYETHYLENE TEREPHTHALATE

(71) Applicant: Niagara Bottling, LLC, Ontario, CA (US)

(72) Inventors: Jay Clarke Hanan, Ontario, CA (US); Vahid Shabafrooz, Ontario, CA (US); Sudheer Bandla, Ontario, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/893,457

(22) Filed: Feb. 9, 2018

(65) Prior Publication Data

US 2018/0171099 A1 Jun. 21, 2018

Related U.S. Application Data

(63) Continuation of application No. 15/177,541, filed on Jun. 9, 2016, now Pat. No. 9,890,263.

(60) Provisional application No. 62/190,189, filed on Jul. 8, 2015.

(51) Int. Cl.
*C08K 3/04* (2006.01)

(52) U.S. Cl.
CPC ............... *C08K 3/04* (2013.01); *C08K 3/042* (2017.05); *C08K 2201/006* (2013.01); *C08K 2201/011* (2013.01)

(58) Field of Classification Search
CPC .................... C08K 3/04; C08K 3/042
See application file for complete search history.

(56) References Cited

U.S. PATENT DOCUMENTS

| | | | |
|---|---|---|---|
| 3,487,049 A | 12/1969 | Busot | |
| 3,657,180 A | 4/1972 | Cohn | |
| 3,709,859 A | 1/1973 | Hrach et al. | |
| 3,907,754 A | 9/1975 | Tershansy et al. | |
| 3,951,905 A | 4/1976 | Sano et al. | |
| 3,962,189 A | 6/1976 | Russin et al. | |
| 4,010,145 A | 3/1977 | Russin et al. | |
| 4,107,149 A | 8/1978 | Bier et al. | |
| 4,501,878 A | 2/1985 | Adams | |
| 5,019,640 A | 5/1991 | Badar et al. | |
| 6,063,465 A * | 5/2000 | Charbonneau | C08L 67/02 428/36.92 |
| 6,713,600 B1 | 3/2004 | Isayev et al. | |
| 7,608,652 B2 | 10/2009 | Bashir et al. | |
| 8,859,668 B2 | 10/2014 | Morishita et al. | |
| 9,636,855 B2 | 5/2017 | Hanan | |
| 9,890,263 B2 * | 2/2018 | Hanan | C08K 3/04 |
| 9,957,360 B2 * | 5/2018 | Hanan | C08L 67/02 |
| 10,087,302 B2 | 10/2018 | Hanan | |
| 10,737,418 B2 | 8/2020 | Hanan et al. | |
| 10,738,167 B2 | 8/2020 | Hanan et al. | |
| 10,808,098 B2 | 10/2020 | Hanan | |
| 2005/0255330 A1 | 11/2005 | Meyer | |
| 2005/0267285 A1 | 12/2005 | Kulkarni et al. | |
| 2006/0148959 A1 | 7/2006 | Isayev et al. | |
| 2007/0216067 A1 | 9/2007 | Bahr et al. | |
| 2009/0140213 A1 | 6/2009 | Sen et al. | |
| 2009/0275689 A1 | 11/2009 | Isayev | |
| 2010/0204072 A1 | 8/2010 | Kwon et al. | |
| 2010/0233458 A1 | 9/2010 | Sun et al. | |
| 2011/0014492 A1 | 1/2011 | Joshi | |
| 2011/0017585 A1 * | 1/2011 | Zhamu | B82Y 30/00 204/157.42 |
| 2012/0098163 A1 | 4/2012 | Avila-Orta et al. | |

(Continued)

FOREIGN PATENT DOCUMENTS

CN 2012/151433 * 11/2012
CN 103242630 A 8/2013

(Continued)

OTHER PUBLICATIONS

English language translation CN 103710790, Apr. 2014.*
English language abstract CN 103710790, Apr. 2014.*
Product Data Sheet, Polyethylene Terephthalate, Sigma-Aldrich, 2021.*
Extended European Search report, EP Patent Application No. 16765786.5, dated Oct. 31, 2018.
Paszkiewicz et al., "Electrical Conductivity of Poly(ethylene terephthalate) Expanded Graphite Nanocomposites Prepared by In Situ Polymeriation", J. Polym. Sci. Part B: Polym. Phys., vol. 50, No. 23, pp. 1645-1652 (2012).
National Center for Biotechnology Information, "Dimethyl Terephthalate" PubChem Compound Database (2005) [online] [retrieved on Aug. 9, 2016], retrieved from the internet URL:https//pubchem.ncbi.nlm.nih.gov/compound/dimethyl_terephthalate#section=Top>p. 1,8.

(Continued)

*Primary Examiner* — Margaret G Moore
(74) *Attorney, Agent, or Firm* — Michael Best & Friedrich LLP

(57) ABSTRACT

A composition and a method are provided for graphene reinforced polyethylene terephthalate (PET). Graphene nanoplatelets comprising a suitable initial surface area are added to a solvent for producing PET. In some embodiments, the solvent comprises ethylene glycol. The solvent and graphene nanoplatelets are sonicated to disperse the nanoplatelets within the solvent. The solvent and graphene nanoplatelets are centrifuged to remove nanoplatelet agglomerates within the solvent. A supernatant solution of dispersed graphene nanoplatelets and solvent is decanted and then used for in-situ polymerization of the graphene reinforced PET comprising a continuous matrix of PET with a dispersed graphene reinforcement phase. The graphene reinforcements comprise a minimal number of layers of two-dimensional mono-atomic carbon sheets. In some embodiments, the number of layers ranges between 1 layer and 7 layers. The graphene reinforced PET preferably comprises a concentration of graphene nanoplatelets being less than substantially 2% weight fraction of the graphene reinforced PET.

9 Claims, 7 Drawing Sheets

(56) References Cited

U.S. PATENT DOCUMENTS

| | | | |
|---|---|---|---|
| 2012/0121840 A1* | 5/2012 | Aksay | C08J 5/046 |
| | | | 428/36.9 |
| 2012/0237749 A1 | 9/2012 | Aksay et al. | |
| 2013/0015409 A1 | 1/2013 | Fugetsu | |
| 2013/0302588 A1* | 11/2013 | Aksay | D01F 1/10 |
| | | | 428/221 |
| 2014/0065402 A1 | 3/2014 | Hanan | |
| 2014/0080962 A1* | 3/2014 | Hanan | B82Y 30/00 |
| | | | 524/496 |
| 2014/0323002 A1 | 10/2014 | Qin et al. | |
| 2017/0009030 A1 | 1/2017 | Hanan et al. | |
| 2017/0009046 A1* | 1/2017 | Hanan | B29C 45/0001 |
| 2017/0081482 A1* | 3/2017 | Hanan | C08J 3/226 |
| 2017/0218166 A1 | 8/2017 | Hanan | |
| 2018/0171099 A1* | 6/2018 | Hanan | C08K 3/04 |
| 2018/0215881 A1* | 8/2018 | Hanan | C08K 3/042 |
| 2020/0308366 A1* | 10/2020 | Hanan | B29B 7/90 |

FOREIGN PATENT DOCUMENTS

| | | |
|---|---|---|
| CN | 103710790 A | 4/2014 |
| GB | 1417738 A | 12/1975 |
| GB | 1522656 A | 8/1978 |
| JP | 2011016902 A | 1/2011 |
| KR | 2011012338 A | 11/2011 |
| WO | 2007145918 A2 | 12/2007 |
| WO | WO2009134492 A2 | 11/2009 |
| WO | WO2011008511 A1 | 1/2011 |
| WO | WO2011028924 A2 | 3/2011 |
| WO | WO2011102473 A1 | 8/2011 |
| WO | 2012151433 A2 | 11/2012 |
| WO | 2013004718 A1 | 1/2013 |
| WO | WO2014144139 A1 | 9/2014 |

OTHER PUBLICATIONS

Wikipedia, "Polyethylene terephthalate", Jun. 25, 2105, [online] [retrieved on Aug. 9, 2016], Retrieved from the Internet URL:https//en.wikipedia.org/w/index/php?title+Polyethylene_terephthalate&oldid=668611834>,p. 5.

Liu et al.,"Promoting the dispersion of graphene and crystallization of poly(lactic acid) with a freezing-dried graphene/PEG masterbatch", Composites Science and Technology, vol. 144, Mar. 20, 2017 pp. 215-222.

Office Action issued from the European Patent Office for related Application No. 16821787.5 dated Apr. 15, 2021 (4 Pages).

Shabafrooz Vahid et al: "Graphene dispersion in a surfactant-free, polar solvent", Journal of Material Science, Kluwer Academic Publishers, Dordrecht, vol. 53, No. 1, Sep. 20, 2017 (pp. 559-572).

Ayoma et al., Melt crystallization of poly(ethylene terephthalate): Comparing addition of graphene vs. carbon nanotubes; Polymer 2014, vol. 55, No. 8, p. 2080.

Al-Jabareen, et al., "Improving the oxygen barrier properties of polyethylene terephthalate by graphite nanoplatelets", Journal of Applied Polymer Science, 2012, vol. 128, No. 3, pp. 1534-1539.

Drzal, L.T., Graphene Nanoplatelets: A Multi-funstional Nanomaterial Additive for Polymers and Composistes, Apr. 2013, http://egsciences.comwp-contant/uploads/2013/04/Drzal-Presentation.pdf.

Feng, et al., "In Situ Synthesis of Poly(Ethylene Terephthalate)/Graphene Composites Wsing a Catalyst Support on Graphite Oxide", 2011, pp. 3931-3939, vol. 21, Publisher: Journal of Materials Chemistry, UK.

Li, et al., "Poly(Ethylene Terephthlate)/Exfoliated Graphite Nanocomposites With Mproved Thermal Stability, Mechanical and Electrical Properties", 2011, pp. 560-566, Publisher: Composites: Part A 42, Published in: US.

World Health Organization, "Cobalt and Cobalt Compounds", IARC Monographs on the Evaluation of Carcinogenic Risks to Humans, vol. 52, pp. 363-472, 1980s, http://monographs.iarc.fr/ENGMonographs/vol52/mom52-16.pdf.

Zhang et al., "Electrically Conductive Polyethylene Terephthalate/Graphene Nanocomposites Prepared by Melt Compounding", 2010, pp. 1191-1196, Publisher: Polymer 51, Published in: US.

International Search Report with Written Opinion for related Application No. PCT/US16/36748, dated Nov. 16, 2016 (8 Pages).

First Office Action issued from the Chinese Patent Office for related Application No. 201680051867.7 dated Nov. 6, 2020 (31 Pages including English Translation).

Examiner's Decision of Rejection issued from the Japanese Patent Office for related Application No. 2018-520372 dated Oct. 27, 2020 (8 Pages including English Translation).

* cited by examiner

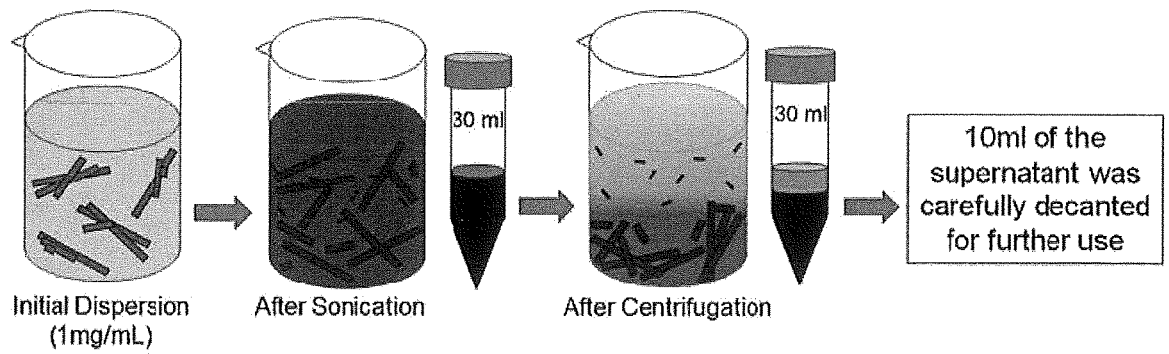
FIG. 6
| Sonication Time | $C_G$ (mg/mL) | | | |
|---|---|---|---|---|
| | Centrifugal Speed (rpm) | | | |
| (hrs) | 1500 | 2500 | 3500 | 4500 |
| 24 | 0.06 | 0.03 | 0.02 | 0.01 |
| 48 | 0.08 | 0.05 | 0.04 | 0.03 |
| 96 | 0.11 | 0.09 | 0.02 | 0.01 |
FIG. 7
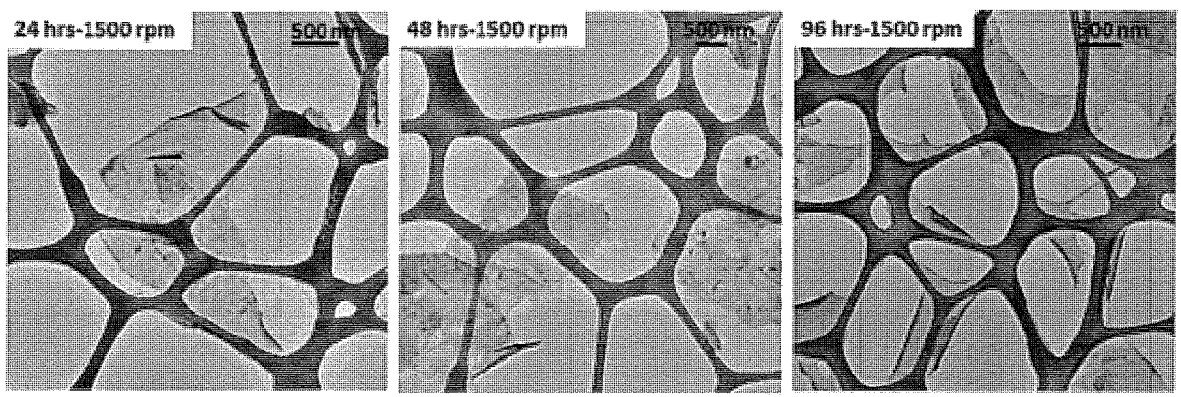
FIG. 8

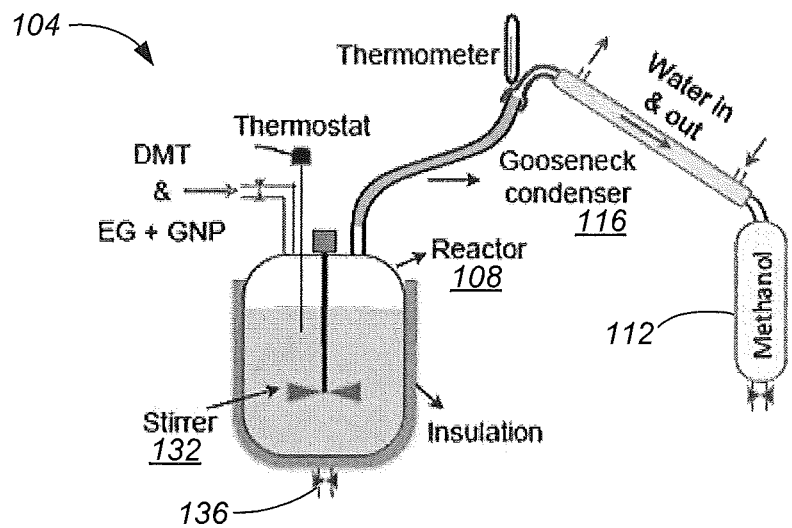
FIG. 12
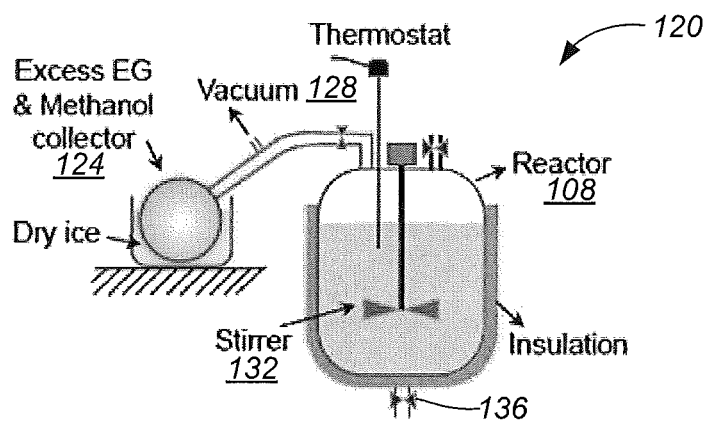
FIG. 13
| Material | E.I. Duration (min) | Methanol Yield (ml) | P.C. Duration (min) | Polymer Yield (g) |
|---|---|---|---|---|
| PET | 180 | 310 | 135 | 160 |
| PET + 0.1% GNP (750 m$^2$/g) | 188 | 310 | 105 | 380 |
| PET + 0.1% GNP (120 m$^2$/g) | 192 | 324 | 112 | 190 |
FIG. 14

GRAPHENE REINFORCED POLYETHYLENE TEREPHTHALATE

PRIORITY

This application claims the benefit of and priority to continuation of U.S. patent application Ser. No. 15/177,541 filed on Jun. 9, 2016, now issued as U.S. Pat. No. 9,890,263 issued on Feb. 3, 2018 and U.S. Provisional Application, entitled "Graphene Reinforced Polyethylene Terephthalate," filed on Jul. 8, 2015 having application Ser. No. 62/190,189.

FIELD

The field of the present disclosure generally relates to polymer composites. More particularly, the field of the invention relates to a graphene reinforced polyethylene terephthalate composition and a method for dispersing graphene nanoplatelets within polyethylene terephthalate.

BACKGROUND

Composites are defined as multiphase materials, which may occur naturally or may be manufactured. Manufactured composites typically are a formulation of one or more materials selected so as to achieve properties that are not individually exhibited by the materials comprising the composite. Composites may be classified based on a type of continuous matrix and dispersed phases, such as a reinforcement. Composite materials comprising at least one constituent phase, primarily the dispersed phase, having at least one dimension on the order of 1-100 nanometers (nm) are referred to as "nanocomposites." Nanocomposites may be further classified based on category (e.g., organic or inorganic), as well as geometry of nanoscale reinforcement. A few well-known examples of naturally occurring nanocomposites include human bone, seashells, spider silk, and armored fish. As will be appreciated, each of these nanocomposite materials comprises a structural hierarchy (i.e., structure at multiple length scales) which makes them perform exceptionally well as compared with other materials of a similar chemistry.

Material properties of composites are known to be dependent on interactions between the matrix and the dispersed phases. Large surface areas per unit volume at the nanoscale generally cause nanomaterials to function differently than their bulk counterparts. With increased interactions between the matrix and the dispersed phase, nanocomposites are considered relatively superior to conventional composites, providing new advantageous properties without compromising existing beneficial properties, such as strength or durability.

Polyethylene terephthalate (PET) is an aromatic semi-crystalline thermoplastic polyester, first synthesized in the early 1940s. FIG. 1 is a chemical formula illustrating a molecular structure of PET. Polyethylene terephthalate is well known for its strength and toughness, high glass transition and melting points, chemical resistance, and optical properties. Polyethylene terephthalate is commonly used for commodity and engineering applications due to its relatively low cost. Polyethylene terephthalate is characterized by a microstructure wherein longitudinal stretching forms strong fibers with a high molecular chain orientation, as well as bi-axial stretching forming strong films. Linear PET is naturally semi-crystalline. Thermal and mechanical history, such as rate of cooling and stretching, can drive PET to be amorphous or more crystalline, and thus influence its mechanical properties. Although PET is utilized in industries such as fiber, packaging, filtration, and thermoforming, the widespread use of PET generally is constrained due to a slow crystallization rate and a limited barrier performance as compared with other commonly used polyesters.

It will be appreciated that there has been a long felt need for developing lightweight materials for use across a wide range of industries, such as packaging, automotive, and aerospace, and thus attempts have been made to improve material properties through better control of material processing and an addition of reinforcements. For example, increasing the crystallinity of PET improves its mechanical and barrier properties. Restrictions with the material, however, such as crystallization rate, and with industrial processes in maximizing crystallinity, such as cooling rate, cycle time, and stretching process, have limited attempts to improve the material properties of PET. Progress in the field of nanomaterials, however, has led to a development of PET nanocomposites which improve the physical properties of PET, thus making PET more effective for applications within the automotive, aerospace, and protective apparel industries. Different types of nanoreinforcements, such as clay, carbon nanofibers (CNF), carbon nanotubes (CNT), graphene, silicon dioxide ($SiO_2$), and the like, have been found to improve many properties of PET, such as mechanical, thermal, barrier, electrical, fire retardation, optical, surface properties, crystallization kinetics of PET, and the like.

As will be appreciated, exfoliation of nanoreinforcements into individual entities and their uniform dispersion into a polymer matrix is essential for the success of polymer nanocomposites. Uniform dispersion of nanoreinforcements in polymers may be achieved by way of various approaches, including, but not limited to, melt-compounding, in-situ polymerization, surface treatment of the nanoreinforcements, and the like. Carbon nanomaterials, such as carbon nanofibers, carbon spheres, carbon nanotubes, and graphene, illustrated in FIG. 2, generally are advantageous due to their superior material properties and simple chemistry. Multifold property improvements may be achieved through the dispersion of carbon nanomaterials into polymers Graphene is a relatively new nanomaterial which comprises a single layer of carbon atoms similar to an unzipped single walled carbon nanotube. Single layer graphene generally is twice as effective as carbon nanotubes in reinforcing polymers since graphene has two flat surfaces for polymer interaction whereas a carbon nanotube comprises only one exterior surface for polymer interaction. It will be appreciated that a development of graphene synthesis methods in conjunction with an introduction of new graphene-based nanomaterials, such as graphene oxide, expanded graphite, and graphene nanoplatelets, has made graphene commercially viable. However, application of graphene-based nanomaterials in fabricating polymer nanocomposites has been hindered due to limited information about the influence of graphene nanomaterials in reinforcing polymers.

Melt-compounding and in-situ polymerization have been the most studied techniques for preparing PET-graphene nanocomposites. Although in-situ polymerization is effective in dispersing graphene, the use of in-situ polymerization heretofore has been limited due to difficulties in attaining a desired molecular weight and a need for expensive reactors. Melt-compounding is a straight-forward approach involving shear mixing, but that alone has not been found to be effective in dispersing graphene in several tested polymer systems. As will be appreciated, achieving a homogenous dispersion of graphene nanoplatelets in PET is critical for improving bulk properties. Dispersing graphene in PET is nontrivial, however, as PET generally is highly viscous (500-1000 Pa s) with a melting temperature of 260° C.-280° C. Thus, selecting a process that facilitates working at high temperatures and with highly viscous materials is necessary.

Another important aspect for an implementation of polymer nanocomposite applications is an ability to predict resultant material properties so as to provide flexibility in designing manufacturing processes and reduce developmental costs. Traditional composite models are not accurate in predicting the properties of nanocomposites. Although micromechanical models based on continuum theory have been found to be effective in estimating short fiber composites, few studies have reported an applicability of these models to nanocomposites.

What is needed, therefore, is an effective and reliable process whereby graphene nanoplatelets may be uniformly dispersed in PET so as to provide reinforced bulk PET, and micromechanical models whereby the material properties of reinforced bulk PET may be predicted.

SUMMARY

A composition and a method are provided for graphene reinforced polyethylene terephthalate (PET). Graphene nanoplatelets comprising a suitable surface area are added to a solvent for producing PET. The average surface area may range between substantially 15-750 $m^2/g$. In some embodiments, the solvent may be comprised of ethylene glycol. The solvent and graphene nanoplatelets are sonicated to disperse the nanoplatelets within the solvent. The solvent and graphene nanoplatelets are centrifuged to remove larger nanoplatelets that are not suitably dispersed within the solvent. A supernatant solution of dispersed graphene nanoplatelets and solvent is decanted and then used for in-situ polymerization of the graphene reinforced PET. The resultant graphene reinforced PET is comprised of a continuous matrix of PET with a dispersed graphene reinforcement phase. The dispersed graphene reinforcements are comprised of a minimal number of layers of two-dimensional mono-atomic carbon sheets. In some embodiments, the number of layers may range between 1 layer and 7 layers. The graphene reinforced PET generally is comprised of a concentration of graphene nanoplatelets that may range between substantially 0.005% weight fraction and 15% weight fraction of the PET-graphene composite. Preferably, however, the graphene reinforced PET is comprised a concentration of graphene nanoplatelets being less than substantially 2% weight fraction of the PET-graphene composite.

In an exemplary embodiment, a graphene reinforced polyethylene terephthalate composition, comprising: a continuous matrix comprising polyethylene terephthalate; and a dispersed reinforcement phase comprising graphene nanoplatelets in the form of a minimal number of layers of two-dimensional mono-atomic carbon sheets. In another exemplary embodiment, the number of layers ranges between substantially 1 layer and 7 layers. In another exemplary embodiment, the number of layers ranges between substantially 1 layer and 4 layers.

In another exemplary embodiment, the graphene reinforced polyethylene terephthalate comprises a concentration of graphene nanoplatelets ranging between substantially 0.1% weight fraction and 15% weight fraction of the graphene reinforced polyethylene terephthalate. In another exemplary embodiment, the graphene reinforced polyethylene terephthalate comprises a concentration of graphene nanoplatelets being less than substantially 2% weight fraction of the graphene reinforced polyethylene terephthalate.

In another exemplary embodiment, the graphene nanoplatelets initially comprise a surface area of 120 $m^2/g$. In another exemplary embodiment, the graphene nanoplatelets initially comprise a surface area of 750 $m^2/g$.

In an exemplary embodiment, a method for preparing graphene reinforced polyethylene terephthalate (PET) comprises obtaining graphene nanoplatelets initially comprising a suitable surface area; adding the graphene nanoplatelets to a solvent suitable for producing PET; sonicating the solvent and graphene nanoplatelets so as to cause a homogeneous dispersion of the graphene nanoplatelets within the solvent; centrifuging the solvent and graphene nanoplatelets to remove larger graphene nanoplatelets that are not suitably dispersed within the solvent; decanting a supernatant solution of graphene nanoplatelets dispersed in the solvent; and using the supernatant solution for in-situ polymerization of the graphene reinforced PET.

In another exemplary embodiment, sonicating comprises immersing the solvent and graphene nanoplatelets in a bath sonicator for a period of time and operating the bath sonicator at a frequency suitable for dispersing the graphene nanoplatelets within the solvent. In another exemplary embodiment, sonicating comprises selecting the period of time so as to desirably reduce a number of layers comprising the graphene nanoplatelets. In another exemplary embodiment, the frequency is an ultrasonic and the period of time ranges between at least 24 hours and 96 hours.

In another exemplary embodiment, centrifuging comprises subjecting the solvent and graphene nanoplatelets to a rotational speed of centrifugation ranging between at least 1500 RPM and 4500 RPM. In another exemplary embodiment, adding the graphene nanoplatelets further comprises selecting ethylene glycol as the solvent suitable for producing PET. In another exemplary embodiment, using the supernatant solution for in-situ polymerization further comprises performing an ester interchange reaction to produce a PET monomer, followed by performing a polycondensation reaction so as to produce a PET polymer chain.

In another exemplary embodiment, performing the ester interchange reaction comprises charging the solution of graphene nanoplatelets dispersed in the solvent and powdered dimethyl terephthalate (DMT) into a reactor under nitrogen purge at a molar ratio of 2.3:1 with an excess of ethylene glycol. In another exemplary embodiment, performing the ester interchange reaction further comprises including a catalyst comprising manganese acetate (Mn $(CH_3COO)_2$) at a concentration of 82 parts-per-million (ppm). In another exemplary embodiment, performing the polycondensation reaction further comprises including a catalyst comprising antimony trioxide ($Sb_2O_3$) at a concentration of 300 ppm. In another exemplary embodiment, performing the polycondensation reaction further comprises adding a suitable concentration of isophthalic acid ($C_6H_4$ $(COH)_2$) so as to limit the crystallinity of PET. In another exemplary embodiment, performing the polycondensation reaction further comprises adding stabilized cobalt at a concentration of 65 ppm so as to control a final color of the PET.

BRIEF DESCRIPTION OF THE DRAWINGS

The drawings refer to embodiments of the present disclosure in which:

FIG. 6 is a schematic illustrating an exemplary sonication and centrifugation process for dispersing graphene nanoplatelets within a solvent, according to the present disclosure;

FIG. 7 is a table illustrating a relationship between a concentration of graphene nanoplatelet dispersion in ethylene glycol as function of sonication time and centrifugal speed, according to the present disclosure;

FIG. 8 comprises transmission electron micrograph images of graphene nanoplatelets dispersed in ethylene glycol after having been sonicated for a duration of 24 hours, 48 hours, and 96 hours, and then centrifuged at a rotational speed of substantially 1500 RPM;

FIG. 12 is a schematic illustrating a reactor for performing an ester interchange reaction, according to the present disclosure;

FIG. 13 is a schematic illustrating a reactor for performing a polycondensation reaction in accordance with the present disclosure; and FIG. 14 is a table listing reaction times and polymer yields for various polymerization batches, according to the present disclosure.

Figure 1:
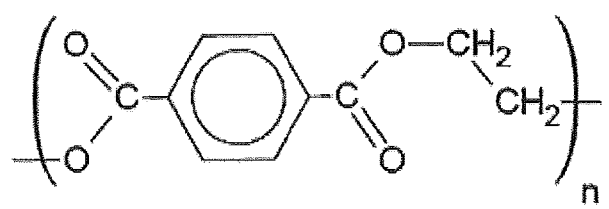
FIG. 1 is a chemical formula illustrating a molecular structure of polyethylene terephthalate in accordance with the present disclosure.
Figure 2:
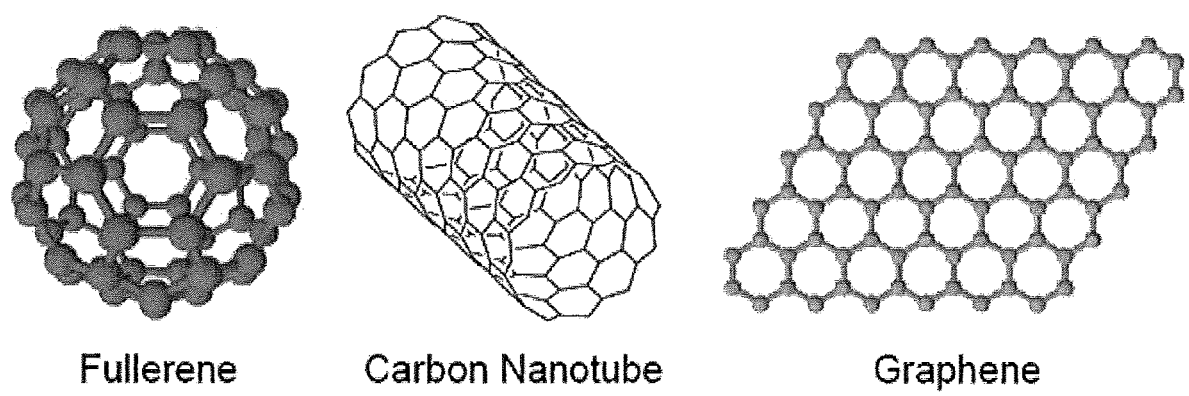
FIG. 2 illustrates unique structures of carbon allotropes in accordance with the present disclosure.

While the present disclosure is subject to various modifications and alternative fauns, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first phase," may be made. However, the specific numeric reference should not be interpreted as a literal sequential order but rather interpreted that the "first phase" is different than a "second phase." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure provides a composition and a method for graphene reinforced polyethylene terephthalate (PET). Graphene nanoplatelets comprising a suitable surface area are added to a solvent for producing PET. In some embodiments, the solvent comprises ethylene glycol. The solvent and graphene nanoplatelets are sonicated to disperse the nanoplatelets within the solvent. The solvent and graphene nanoplatelets are centrifuged to remove larger nanoplatelets that are not suitably dispersed within the solvent. A supernatant solution of dispersed graphene nanoplatelets and solvent is decanted and then used for in-situ polymerization of the graphene reinforced PET. The resultant graphene reinforced PET comprises a continuous matrix of PET with a dispersed graphene reinforcement phase. The dispersed graphene reinforcements comprise a minimal number of layers of two-dimensional mono-atomic carbon sheets. In some embodiments, the number of layers ranges between 1 layer and 7 layers. Preferably, the graphene reinforced PET comprises a concentration of graphene nanoplatelets being less than substantially 2% weight fraction of the PET-graphene composite.

Figure 3:
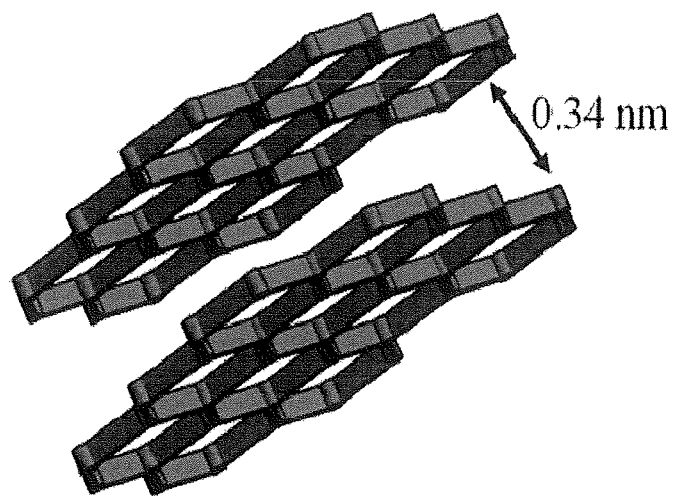
FIG. 3 illustrates a molecular structure of graphene comprising a two-dimensional mono-atomic thick carbon allotrope, having a hexagonal structure in accordance with the present disclosure.

FIG. 3 illustrates a molecular structure of graphene comprising a two-dimensional mono-atomic thick carbon allotrope, having a planar $sp^2$ hybridization structure with a C—C bond distance of 0.142 nm. A thickness of a single graphene sheet is estimated to be substantially 0.335 nm. The density of single layer graphene has been calculated to be 0.77 mg m$^{-2}$. Possessing a Young's modulus of 1.02±0.03 TPa and a strength of 130±10 GPa, it will be appreciated that graphene is regarded as the strongest material with appreciable size. Further, graphene exhibits a negative coefficient of thermal expansion, $\alpha=-4.8\pm1.0\times10^{-6}$ K$^{-1}$ through a temperature range of 0-300 K, and a very high thermal conductivity of 3000 W mK$^{-1}$. Graphene sheets have been found to be hydrophobic and have a surface energy at room temperature of 46.7 mJ m$^{-2}$.

Figure 4:
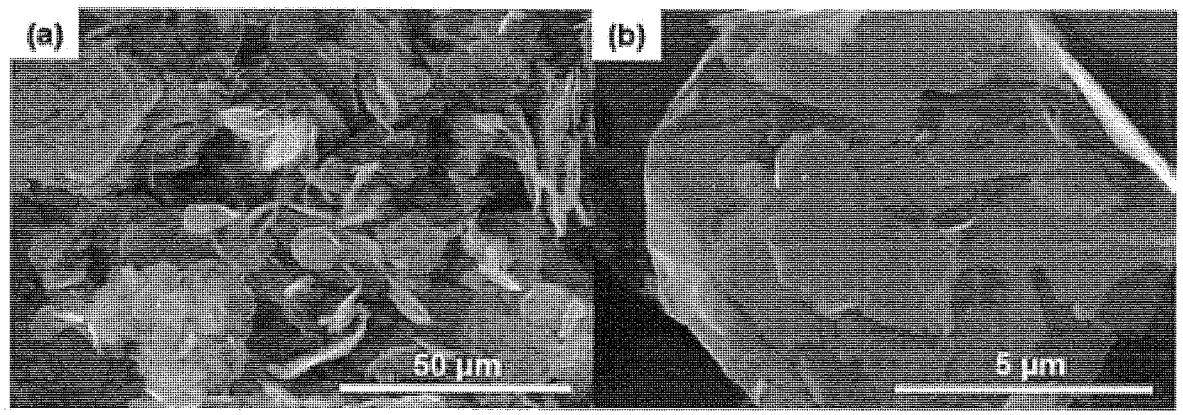
FIG. 4 comprises micrograph images of graphene nanoplatelets, according to the present disclosure.

In some embodiments, graphene in the form of graphene nanoplatelets (GNPs) may be obtained by way of any of various commercial suppliers. Commercially available graphene nanoplatelets generally comprise two different average surface areas. In some embodiments, graphene nanoplatelets with an average diameter of 5 micrometers (µm), a thickness ranging between 6 nm and 8 nm, and an average surface area of 120-150 m$^2$/g, may be used to prepare nanocomposites. In some embodiments, graphene nanoplatelets with an average diameter of 2 µm, and an average surface area of 750 m$^2$/g may be used for in-situ polymerization. In some embodiments, the graphene nanoplatelets may be obtained in an initially dry agglomerated powder form, wherein each agglomerated platelet comprises several nanoplatelets, as shown in FIG. 4. As will be appreciated, the nanoplatelets generally are not uniform and comprise uneven edges.

As discussed herein, in-situ polymerization may be employed in the preparation of polymer nanocomposites, such as graphene reinforced PET. As will be appreciated, in-situ polymerization generally includes two steps. A first step comprises intercalating nanoscale reinforcements in a solution phase by way of compatible polymer precursors or solvents. In a second step, polymerization is undertaken using the nanoplatelet intercalated solution. As will be appreciated, dispersing the nanoplatelets into a chemically compatible and low viscosity material is more efficient than directly mixing nanoplatelets with a highly viscous polymer melt. As such, it will be appreciated that since ethylene glycol (EG) is a raw material used for polymerization of PET, ethylene glycol may be advantageously used as a solvent for dispersing graphene nanoplatelets. It should be understood, however, that the polymerization of PET disclosed herein is not to be limited to using ethylene glycol as a solvent for dispersing graphene nanoplatelets, but rather other suitable solvents may be used for dispersing graphene nanoplatelets, without limitation, such as isopropanol (IPA), N-Methyl-2-pyrrolidinone (NMP), and the like.

Figure 5:
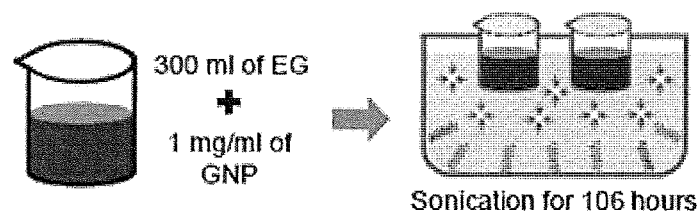
FIG. 5 is a schematic illustrating an exemplary sonication process for dispersing graphene nanoplatelets within ethylene glycol in accordance with the present disclosure.

FIG. 5 is a schematic illustrating an exemplary sonication process for dispersing graphene nanoplatelets within ethylene glycol in accordance with the present disclosure. As indicated in FIG. 5, in some embodiments, graphene nanoplatelets may be added to reagent grade ethylene glycol at a concentration of 1 mg/ml (i.e., 0.1% weight fraction), placed into suitably sized solution beakers, and then sonicated for a specific period of time using a bath sonicator at a predetermined frequency. In one embodiment, the bath sonicator operates at a frequency of 40 kHz for a period of 106 hours so as to ensure a homogenous dispersion of graphene nanoplatelets within the ethylene glycol. In some embodiments, the frequency may be ultrasonic, and the time period may be at least 24 hours, 48 hours, 96 hours, or any period of time deemed appropriate to homogenously disperse the graphene nanoplatelets within the ethylene glycol. During the sonication process, illustrated in FIG. 5, the solution beakers were covered with aluminum foil so as to prevent exposure to atmospheric oxygen. Moreover, in some embodiments, dispersions may be prepared by way of either low (120 $m^2/g$) or high (750 $m^2/g$) surface area graphene nanoplatelets. It should be further understood that the concentration of graphene nanoplatelets is not limited to 0.1% weight fraction, but rather other concentrations may be formed, such as, by way of non-limiting example, any concentration up to 2%, 5%, 10% and 15% weight fraction. Preferably, however, the concentration of graphene nanoplatelets is less than substantially 2% weight fraction of the PET-graphene nanocomposite.

As will be appreciated, regardless of the length of time during which sonication is maintained, only a portion of the graphene nanoplatelets in solution will be suitably dispersed within the ethylene glycol. Thus, a centrifuge may be utilized to remove the portion of larger graphene nanoplatelets that are not suitably dispersed within the ethylene glycol. FIG. 6 is a schematic illustrating an exemplary process comprising sonication and centrifugation whereby larger graphene nanoplatelets are removed, thus leaving a supernatant solution of ethylene glycol with dispersed graphene nanoplatelets. After centrifugation, the supernatant solution of ethylene glycol and dispersed graphene nanoplatelets may be decanted for use in polymerization of PET, as described herein.

It should be understood that centrifugation may be performed at any rotational speed deemed suitable, and for any period of time as needed. In some embodiments, centrifugation may be performed at a rotational speed of at least 1500 revolutions per minute (RPM). In some embodiments, the rotational speed of centrifugation may be at least 2500 RPM. In some embodiments, the rotational speed of centrifugation may be at least 3500 RPM. Further, in some embodiments, centrifugation may be performed at a rotational speed of at least 4500 RPM. Those skilled in the art will recognize that the concentration of remaining material in the supernatant may be evaluated by measuring an optical absorbance of the graphene and then correlating the optical absorbance (A) to the concentration of graphene after centrifugation ($C_G$) by way of Beer-Lambert's law $A=\alpha C_G l$. FIG. 7 is a table illustrating a relationship between the concentration of graphene nanoplatelet dispersions in ethylene glycol as a function of sonication time and centrifugal speed, as described herein. FIG. 7 indicates that in some embodiments, sonication and centrifugation disperses graphene nanoplatelets in ethylene glycol at concentrations of up to 0.11 mg/mL.

In some embodiments, transmission electron microscopy (TEM) may be used to determine a degree of exfoliation of graphene nanoplatelets within the ethylene glycol. As will be appreciated, a difference in electron densities between ethylene glycol and the graphene nanoplatelets provides a visible contrast in transmission electron micrographs. The graphene nanoplatelets appear as dark regions due to their relatively higher density as compared to the density of ethylene glycol. Thus, TEM is capable of providing two-dimensional information about the exfoliated graphene nanoplatelets, such as thickness, length, and diameter of the nanoplatelets. FIG. 8 comprises three micrographs illustrating TEM images for graphene dispersion samples that were sonicated for a duration of 24 hours, 48 hours, and 96 hours, and then centrifuged at a rotational speed of substantially 1500 RPM.

Figure 9A:
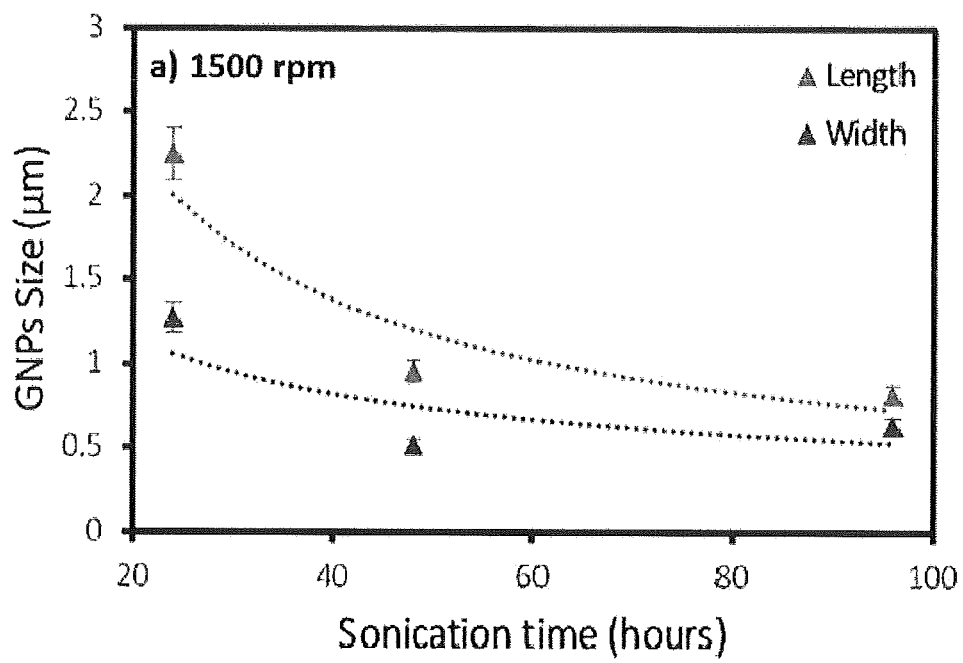
FIG. 9A is a graph illustrating an average length and width of graphene nanoplatelets dispersed in ethylene glycol as a function of sonication time and a centrifugation speed of substantially 1500 RPM.
Figure 9B:
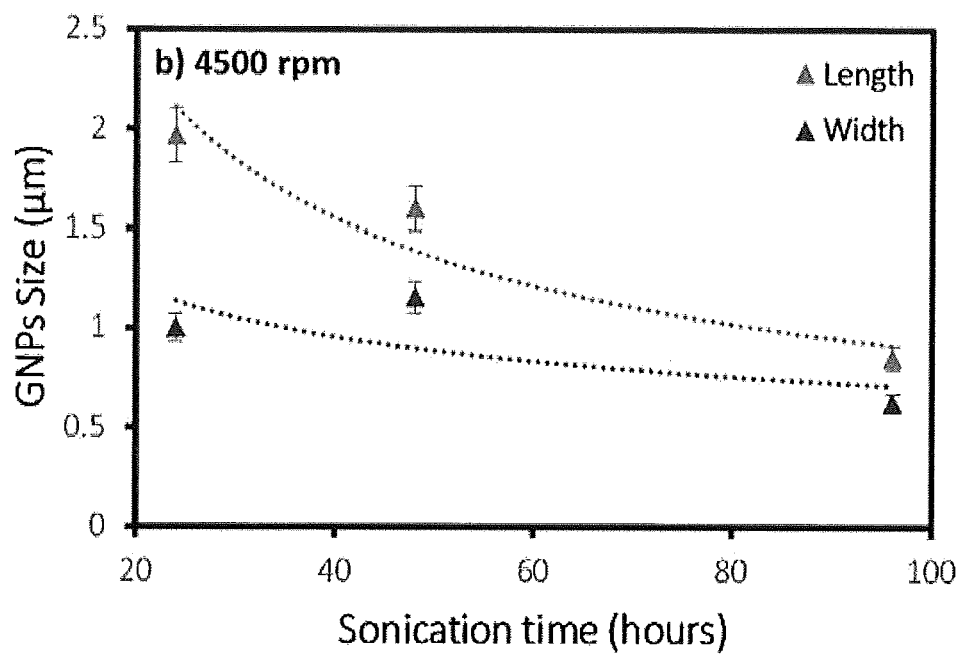
FIG. 9B is a graph illustrating an average length and width of graphene nanoplatelets dispersed in ethylene glycol as a function of sonication time and a centrifugation speed of substantially 4500 RPM.

As will be appreciated, transmission electron micrographs such as those illustrated in FIG. 8 facilitate developing a relationship between a sheet size of the dispersed graphene nanoplatelets and the duration of sonication. FIG. 9A is a graph illustrating an average length and width of the dispersed graphene nanoplatelets as a function of sonication time and a centrifugation speed of 1500 RPM. FIG. 9B is a graph which is substantially similar to the graph illustrated in FIG. 9A, with the exception that the graphene dispersion samples represented in the graph illustrated in FIG. 9B were centrifuged with a rotational speed of substantially 4500 RPM. FIGS. 9A and 9B indicate that increasing the duration of sonication is associated with a reduction in the average length and width of the nanoplatelets.

While the transmission electron micrographs shown in FIG. 8 provide information about the average length and width of the dispersed graphene nanoplatelets, information about the thickness (i.e., a number of layers) of the nanoplatelets is required to better determine the degree of exfoliation of graphene nanoplatelets within the ethylene glycol. It will be appreciated that Raman spectroscopy is a widely used technique for characterizing graphene. A characteristic Raman spectrum of single layer graphene is known to have a peak near 1580 $cm^{-1}$ (G-band) corresponding to C—C stretching of $sp^2$ carbon materials. Another peak near 2680 $cm^{-1}$ (G'-band) is a corresponding higher order mode. In some cases, a presence of defects in graphene are known to give rise to a Raman peak near 1350 $cm^{-1}$ (D-band), which is useful in analyzing the quality of graphene. In the case of multi-layer graphene, the intensity of the G-band (~1580 cm$^{-1}$) may be used to identify graphene nanoplatelets comprising a thickness ranging between 1 layer and 7 layers. Further, in some embodiments a shape of the G'-band (~2680 cm$^{-1}$), or a 2D-band, may be used to identify graphene nanoplatelets comprising a thickness ranging between 1 layer and substantially 4 layers.

Figure 10:
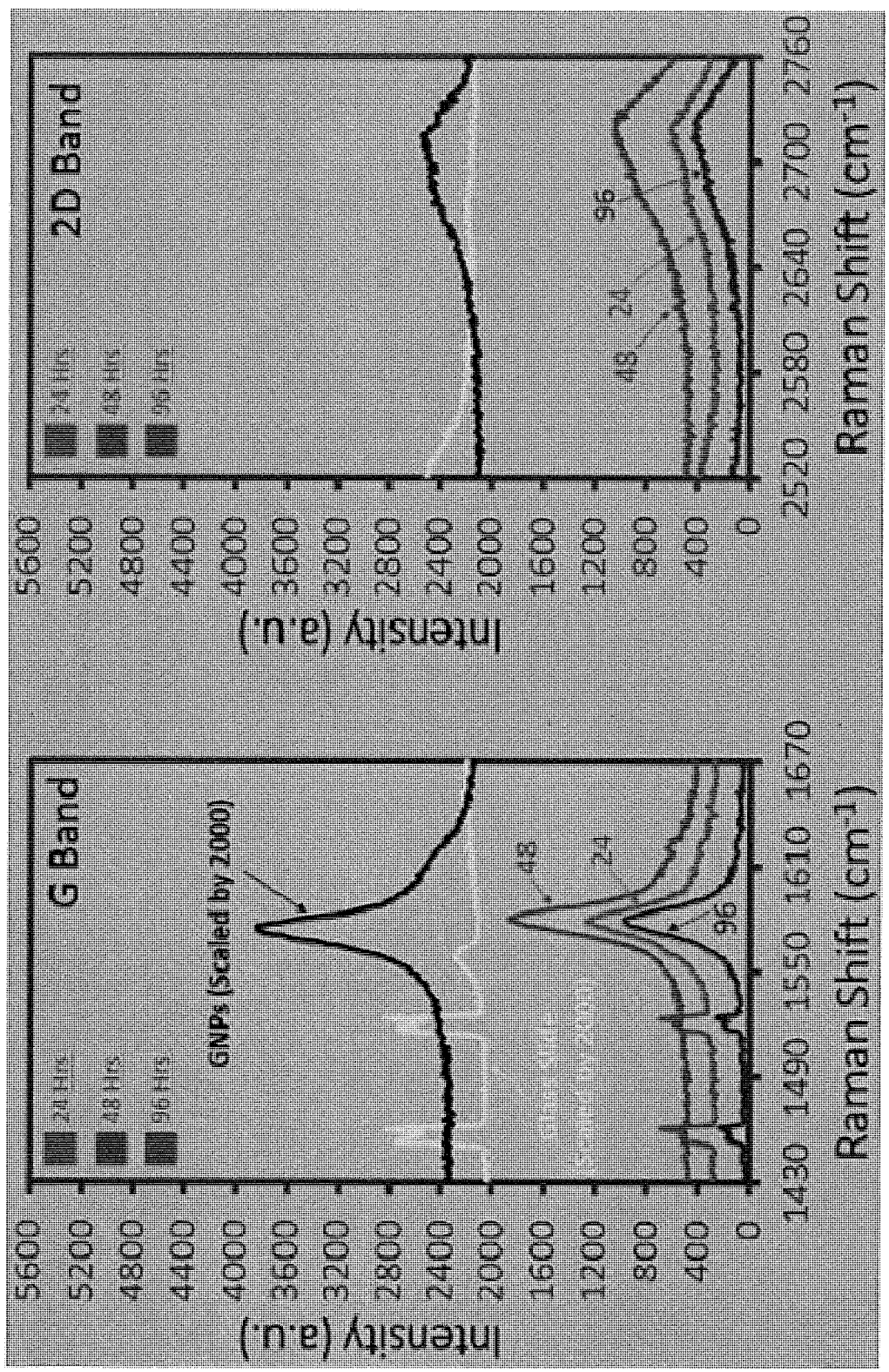
FIG. 10 comprises a Raman analysis of graphene nanoplatelets dispersed in ethylene glycol that were sonicated for a duration of 24 hours, 48 hours, and 96 hours, and then centrifuged at a rotational speed of substantially 1500 RPM.

FIG. 10 comprises a Raman analysis of the graphene dispersion samples that were subjected to TEM imaging in FIG. 8. As will be appreciated, a ratio of $I_{2D}/I_G$ represents the number of layers comprising the dispersed graphene nanoplatelets. Upon coupling the Raman analysis of FIG. 10 with the TEM data shown in FIG. 8 and plotted in FIGS. 9A and 9B, it becomes apparent that increasing the duration of sonication better separates the dispersed graphene nanoplatelets into individual layers, but sonication also operates to decrease the average sheet size of the nanoplatelets.

Once the graphene nanoplatelets are suitably dispersed within the ethylene glycol, the solution may be used for in-situ polymerization of graphene reinforced polyethylene terephthalate. In some embodiments, in-situ polymerization of graphene nanoplatelets dispersed in ethylene glycol and dimethyl terephthalate may be performed by way of a two-step reaction. A first step is an ester interchange reaction (EI), illustrated in FIG. 11A, wherein a PET monomer and excess methanol are formed. In a second step, illustrated in FIG. 11B, a PET polymer chain and excess ethylene e glycol are formed by way of a polycondensation reaction (PC).

Figure 11A:
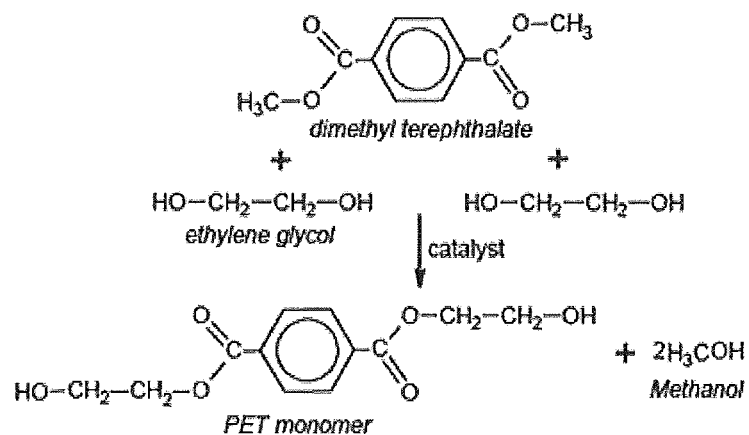
FIG. 11A is a chemical formula illustrating an ester interchange reaction between dimethyl terephthalate (DMT) and ethylene glycol (EG) to form a PET monomer and excess methanol in accordance with the present disclosure.

FIG. 12 is a schematic illustrating an exemplary embodiment of a reactor 104 for performing the ester interchange reaction illustrated in FIG. 11A. The reactor 104 generally comprises an insulated reaction chamber 108, a methanol collector 112, and a gooseneck condenser 116. In the embodiment illustrated in FIG. 12, powdered dimethyl terephthalate (DMT) is used for the polymerization. Ethylene glycol with dispersed graphene nanoplatelets and the powdered DMT are charged into the reaction chamber 108 under nitrogen purge at a 2.3:1 molar ratio, with an excess of ethylene glycol. Catalysts for the ester interchange reaction, manganese acetate ($Mn(CH_3COO)_2$), and for the polycondensation reaction, antimony trioxide ($Sb_2O_3$), are also added to the batch at 82 parts-per-million (ppm) and 300 ppm, respectively, and then the batch is heated to a batch temperature of substantially 175° C. under constant stirring.

Methanol collection begins when the batch approaches a temperature of about 170° C., indicating that the ester interchange reaction has started. Thus, when methanol collection begins, the nitrogen purge may be closed. In some embodiments, the batch temperature may be increased in steps, such as steps of 15° C. until the batch temperature reaches substantially 235° C. While the ester interchange reaction progresses, a temperature within the gooseneck condenser 116 will increase from room temperature to above 60° C. Once the gooseneck condenser temperature drops below 60° C., and the methanol collector 112 reaches a theoretical yield of 300 ml, the ester interchange reaction may be considered substantially finished. In some embodiments, the gooseneck condenser 116 may be removed and polyphosphoric acid ($H_3PO_4$) added to the batch at 38 ppm so as to terminate the ester interchange reaction. Those skilled in the art will appreciate that the entire ester interchange reaction may be performed by way of the rector 104 within a time period of substantially 3-4 hours.

Figure 11B:
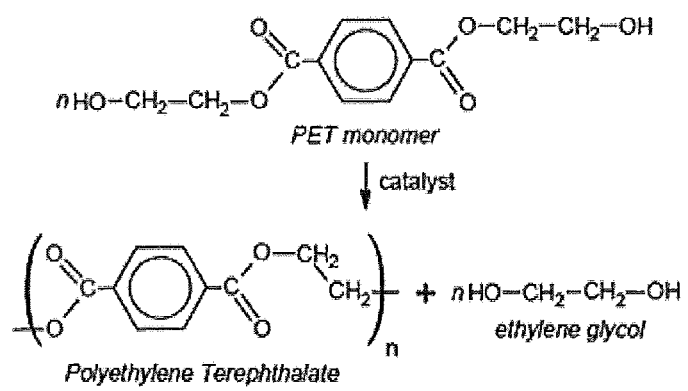
FIG. 11B is a chemical formula illustrating formation of a PET polymer chain and excess ethylene glycol by way of the PET monomer of FIG. 11A, in accordance with the present disclosure.

FIG. 13 is a schematic illustrating an exemplary embodiment of a reactor 120 for performing the polycondensation reaction illustrated in FIG. 11B. In the embodiment illustrated in FIG. 13, the reactor 120 comprises a reaction chamber 108, an excess EG collection condenser 124 and a vacuum pump 128. During the polycondensation reaction, a temperature within the reaction chamber 108 may be increased to substantially 285° C. and maintained under vacuum (~30 mm Hg) until PET of a desired viscosity is obtained. In some embodiments, isophthalic acid ($C_6H_4(COH)_2$) and stabilized cobalt may be added at 20 grams and 65 ppm, respectively, to the batch at the beginning of the polycondensation reaction. It will be appreciated that isophthalic acid limits the crystallinity of PET, thus making the PET easier to process. The stabilized cobalt operates so as to control a final color of the PET.

As the polycondensation reaction progresses, the molecular weight of PET increases within the reaction chamber 108 and ethylene glycol is released into the EG collection condenser 124. In some embodiments, the EG collection condenser 124 may comprise a round flask surrounded with dry ice so as to solidify the collected ethylene glycol, and thereby prevent the ethylene glycol from flowing into the vacuum pump 128.

It will be appreciated that as an increasing amount of PET is produced, the viscosity of the batch within the reaction chamber 108 will correspondingly change. As the quantity of PET increases, the viscosity of the batch increases and thus requires an increasing amount of mechanical power to stir the batch. Accordingly, the increasing PET will affect an electric current required to power a stirrer 132 within the chamber. Thus, monitoring the electric current passed to the stirrer 132 provides an indication of the progress of the polycondensation reaction. In one exemplary embodiment, the electric current passed to the stirrer 132 is monitored for change at 15-minute intervals. Once no change in the electric current is detected at two consecutive readings, the polycondensation reaction may be considered substantially finished. The vacuum pump 128 may then be stopped and the resultant polymer melt may be extruded from an opening 136 at the bottom of the reactor 120. In some embodiments, the polymer melt may be extruded from the opening 136 into an ice water bath and pelletized using a strand chopper. FIG. 14 illustrates reaction times and yields for exemplary batch polymerizations performed by way of the reactors 104, 120 respectively illustrated in FIGS. 12 and 13. Further, one of the exemplary batch polymerizations comprises an absence of graphene nanoplatelets and thus serves as a control batch polymerization.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A method for preparing graphene reinforced polyethylene terephthalate (PET), the method comprising:

adding graphene nanoplatelets to a solvent suitable for producing PET;
sonicating the solvent and graphene nanoplatelets utilizing a sonicator so as to cause a homogeneous dispersion of the graphene nanoplatelets within the solvent;
centrifuging the solvent and graphene nanoplatelets to remove larger graphene nanoplatelets that are not suitably dispersed within the solvent;
decanting a supernatant solution of graphene nanoplatelets dispersed in the solvent; and
performing an ester interchange reaction to produce a polyethylene terephthalate monomer, followed by performing a polycondensation reaction so as to produce a polyethylene terephthalate polymer chain,
the ester interchange reaction comprising charging the solution of graphene nanoplatelets dispersed in the solvent and powdered dimethyl terephthalate (DMT) into a reactor under nitrogen,
wherein resultant dispersed graphene reinforcements comprise graphene nanoplatelets in the form of one or more layers of two-dimensional mono-atomic carbon sheets, the number of layers ranging between 1 and 7.

2. The method of claim 1, wherein sonicating comprises selecting the period of time so as to desirably reduce a number of layers comprising the graphene nanoplatelets.

3. The method of claim 1, wherein centrifuging comprises subjecting the solvent and graphene nanoplatelets to a rotational speed of centrifugation ranging between at least 1500 RPM and 4500 RPM.

4. The method of claim 1, wherein adding the graphene nanoplatelets further comprises selecting ethylene glycol as the solvent suitable for producing PET.

5. The method of claim 1, wherein the solvent further comprises ethylene glycol; and
wherein performing the ester interchange reaction further comprises a nitrogen purge at a molar ratio of 2.3:1 with a stoichiometric excess of ethylene glycol.

6. The method of claim 5, wherein performing the ester interchange reaction further comprises including a catalyst comprising manganese acetate ($Mn(CH_3COO)_2$) at a concentration of 82 parts-per-million (ppm).

7. The method of claim 5, wherein performing the polycondensation reaction further comprises including a catalyst comprising antimony trioxide ($Sb_2O_3$) at a concentration of 300 ppm.

8. The method of claim 5, wherein performing the polycondensation reaction further comprises adding a suitable concentration of isophthalic acid ($C_6H_4(COH)_2$) so as to limit the crystallinity of PET.

9. The method of claim 5, wherein performing the polycondensation reaction further comprises adding stabilized cobalt at a concentration of 65 ppm so as to control a final color of the PET.

\* \* \* \* \*